United States Patent
Leclercq et al.

(10) Patent No.: US 8,572,390 B2
(45) Date of Patent: Oct. 29, 2013

(54) METHOD FOR TRANSMITTING AND RECEIVING DATA, IN PARTICULAR FOR SECURE EXCHANGES BETWEEN AN AIRCRAFT AND A GROUND BASE, RELATED DEVICES AND AIRCRAFT EQUIPPED WITH SUCH DEVICES

(75) Inventors: Agnes Leclercq, Toulouse (FR); Cecile Colle-Morlec, Labarthe sur Leze (FR)

(73) Assignee: Airbus Operations S.A.S., Toulouse (FR)

( * ) Notice: Subject to any disclaimer, the term of this patent is extended or adjusted under 35 U.S.C. 154(b) by 1307 days.

(21) Appl. No.: 12/294,311

(22) PCT Filed: Mar. 27, 2007

(86) PCT No.: PCT/FR2007/000524
§ 371 (c)(1),
(2), (4) Date: Sep. 24, 2008

(87) PCT Pub. No.: WO2007/110509
PCT Pub. Date: Oct. 4, 2007

(65) Prior Publication Data
US 2009/0138716 A1 May 28, 2009

(30) Foreign Application Priority Data
Mar. 29, 2006 (FR) ...................................... 06 51086

(51) Int. Cl.
*H04L 9/32* (2006.01)
(52) U.S. Cl.
USPC ........... 713/181; 713/168; 713/190; 713/191; 380/217; 380/229; 380/239; 380/269; 714/746; 714/797

(58) Field of Classification Search
USPC .......... 713/168, 181, 190, 191; 380/217, 229, 380/239, 269; 714/746, 797
See application file for complete search history.

(56) References Cited

U.S. PATENT DOCUMENTS

| | | | |
|---|---|---|---|
| 5,907,619 A * | 5/1999 | Davis | 713/176 |
| 5,915,018 A | 6/1999 | Aucsmith | |
| 6,629,150 B1 | 9/2003 | Huded | |
| 6,677,888 B2 | 1/2004 | Roy | |
| 8,171,567 B1 * | 5/2012 | Fraser et al. | 726/32 |
| 2003/0030581 A1 | 2/2003 | Roy | |
| 2003/0037238 A1 | 2/2003 | Warner et al. | |

(Continued)

FOREIGN PATENT DOCUMENTS

| | | |
|---|---|---|
| EP | 1 286 244 | 2/2003 |
| JP | 10-271011 | 10/1998 |

(Continued)

OTHER PUBLICATIONS

Schneier, B., "Applied Cryptography Passage", Applied Cryptography. Protocols, Algorithms, and Source Code in C, p. 226 (1996) XP-002408909.

(Continued)

*Primary Examiner* — Thu Ha Nguyen
(74) *Attorney, Agent, or Firm* — Oblon, Spivak, McClelland, Maier & Neustadt, L.L.P.

(57) ABSTRACT

A method for transmitting data, a receiving method, related devices, and an aircraft equipped with the devices. The method includes determining an authentication word of the data; processing the data to obtain processed data; and transmitting the processed data on a transmission channel.

18 Claims, 2 Drawing Sheets

(56) References Cited

U.S. PATENT DOCUMENTS

| | | |
|---|---|---|
| 2003/0065656 A1 | 4/2003 | de la Torre et al. |
| 2004/0047405 A1 | 3/2004 | Boesel et al. |
| 2006/0229090 A1* | 10/2006 | LaDue .......................... 455/507 |
| 2008/0017722 A1* | 1/2008 | Snyder et al. ................. 235/494 |
| 2008/0025515 A1* | 1/2008 | Coombs ........................ 380/277 |
| 2009/0099761 A1* | 4/2009 | Davis et al. ................... 701/120 |
| 2011/0208966 A1* | 8/2011 | Silverbrook .................. 713/168 |
| 2011/0255690 A1* | 10/2011 | Kocher et al. ................. 380/210 |
| 2011/0264923 A1* | 10/2011 | Kocher et al. ................. 713/189 |
| 2012/0001726 A1* | 1/2012 | de Velasco Cortina et al. ........................... 340/5.52 |
| 2012/0070002 A1* | 3/2012 | Smith ........................... 380/277 |
| 2012/0177198 A1* | 7/2012 | Cabos ........................... 380/270 |
| 2013/0127595 A1* | 5/2013 | de Velasco Cortina et al. ........................... 340/5.74 |

FOREIGN PATENT DOCUMENTS

| | | |
|---|---|---|
| JP | 2002-63147 | 2/2002 |
| JP | 2005-502243 | 1/2005 |
| JP | 2006-31097 | 2/2006 |
| WO | WO 2005/045653 A1 | 5/2005 |

OTHER PUBLICATIONS

J. Callas, et al., "OpenPGP Message Format", Standards Track, Nov. 1998, pp. 1-7.

Japanese Office Action for Japanese Patent Publication No. 2009-502144 dated Apr. 16, 2013.

Office Action issued Aug. 21, 2012 in Japanese Application No. 2009-502144 (With English Translation).

\* cited by examiner

METHOD FOR TRANSMITTING AND RECEIVING DATA, IN PARTICULAR FOR SECURE EXCHANGES BETWEEN AN AIRCRAFT AND A GROUND BASE, RELATED DEVICES AND AIRCRAFT EQUIPPED WITH SUCH DEVICES

The invention relates to methods for emitting and receiving data, particularly with a view to secure exchanges between an aircraft and a ground base, corresponding devices and an aircraft equipped with such devices.

Such methods already have been proposed with the objective of exchanging messages of different types represented by transmitted data, as described, for example, in US Patent Application 2003/0030581.

In this connection, it is provided that diverse processing operations will be applied to the initial data representing the message to be transmitted, with objectives specific to each processing operation: for example, the data are compressed in order to limit the pass band necessary for transport thereof, they are encrypted to provide for the confidentiality thereof and they are authenticated to ensure the integrity and origin thereof.

For good operating safety, the algorithms that employ these processing operations (generally software programs executed by microprocessors in the emitter or receiver) must be sufficiently robust (and therefore developed and tested with particularly stringent constraints) and must include mechanisms for detection and processing of operating defects, thus making them complex and their development cost high. It is therefore necessary in practice to choose software programs having a high level of certification for processing the data to be exchanged.

In order to reduce this constraint, and therefore in particular to make it possible to facilitate the development of algorithms used for processing of messages to be exchanged without nevertheless compromising operating safety and exchange security, the invention proposes a data emission method characterized by the following steps:
  determination of an authentication word for the data;
  data processing to obtain processed data, the processing operation comprising a compression step;
  emission of the processed data on a transmission channel.

The authentication word therefore relates to the data before processing, especially before compression, which makes it possible in particular to verify, during verification of the authentication used in reception, the absence of error in the processing operations effected in both emission and reception.

The determination step comprises, for example, the application of a hash function to the data; thus there are used the mathematical properties of hash functions, by virtue of which any modification in the data implies a change of the result, or in other words of the authentication word (or imprint).

The application of the hash function may additionally use a cryptographic key, which makes it possible to improve the security of the system.

For example, the processing operation mentioned above additionally comprises an encryption step (which may be applied to the data and to the authentication word) and/or a step of conversion of 8-bit words to 6-bit words, or of a binary flux ("bitstream" in English) to transmittable characters.

In one particularly advantageous application, the transmission channel is a channel for exchange of data between an aircraft and a ground base.

Correlatively, the invention also proposes a method for receiving data, characterized by the following steps:
  reception of the data on a transmission channel;
  processing of the received data, the processing operation comprising a decompression step;
  verification of authentication of the processed data.

In this way, since verification of authentication is applied to the processed data (especially after decompression), it will make it possible in particular to assure exactness of the applied processing operation.

The verification step, for example, comprises in practice the following steps:
  calculation of an imprint of at least part of the processed data;
  comparison of the calculated imprint with a received imprint.

The step of calculation of the imprint may comprise a step of application of a hash function to the said data portion, in a manner corresponding to that mentioned for emission, and having the same advantages. The application of the hash function may then also use a cryptographic key. In this case, in fact, the received imprint is generally the result of application, during emission, of the hash function to the data to be emitted.

The processing operation may additionally comprise a step of decryption and/or a step of deconversion of 6-bit words to 8-bit words or of characters received to a bitstream.

The invention also proposes a device for emitting data, characterized by means for determining a data authentication word, data-processing means for obtaining processed data, the processing means comprising compression means, and means for emitting the processed data on a transmission channel.

Correlatively, the invention proposes a device for receiving data, characterized by means for receiving data on a transmission channel, means for processing the received data, the processing means comprising decompression means, and means for verifying authentication of the processed data.

These devices may have optional characteristics corresponding to the steps and characteristics envisioned hereinabove for the emission and reception methods.

These devices may be used, for example, as equipment in an aircraft.

Other characteristics and advantages of the invention will become clearer upon reading the following description, written with reference to the attached drawings, wherein:

FIG. 1 represents the general context in which the invention is used.

A ground base B communicates with an aircraft A by means of a link that permits exchange of data in digital form (or in other words according to the English term "data link") and that involves in particular a ground-to-air link $C_A$.

Figure 1:
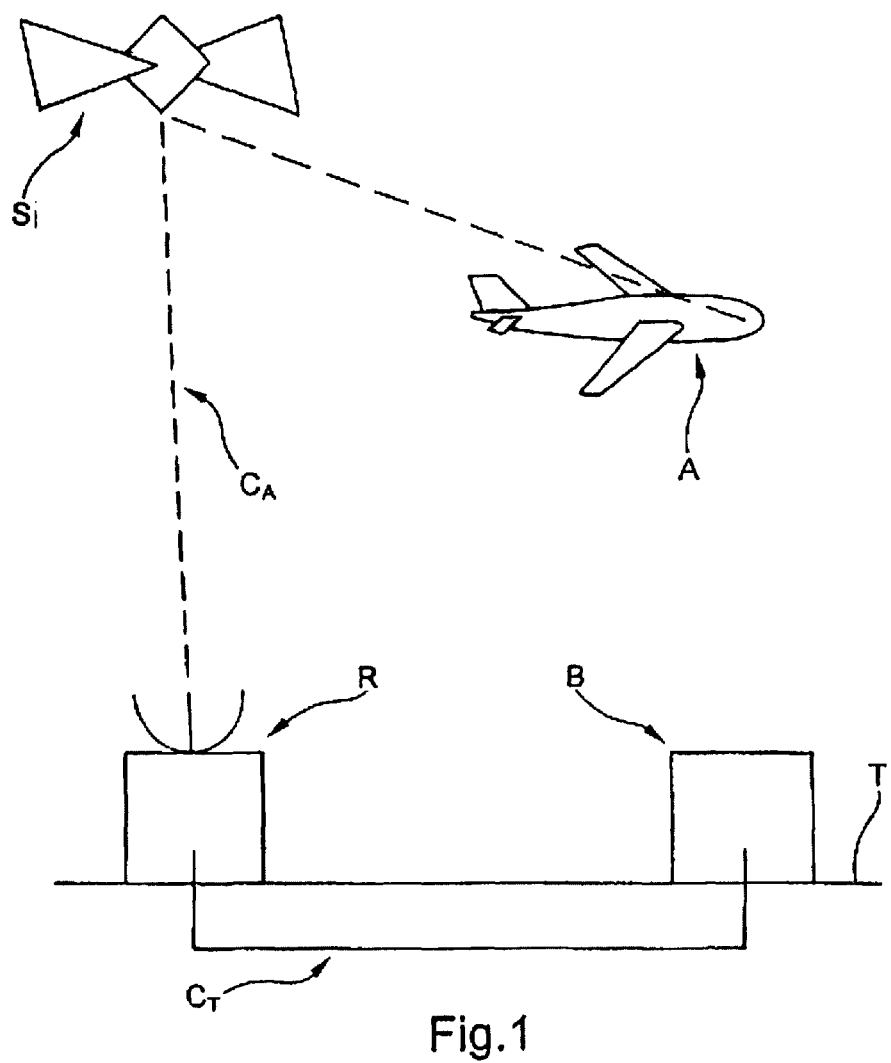
FIG. 1 represents the general context of the invention.

The link between ground base B and aircraft A may additionally involve other devices and links. For example, in FIG. 1, ground base B communicates with a relay R (also situated on ground T) by means of a land communication network $C_T$; relay R transmits the information items intended for and originating from aircraft A by way of a satellite S.

It is noted that the use of a relay R is relatively common, because information items exchanged between ground base B and aircraft A are traditionally routed through relay R and satellite S under the responsibility of a service provider.

Alternatively, it could be provided that the information items are exchanged directly between aircraft A and ground base B.

Furthermore, it could be provided that HF or VHF radio communications are used instead of communication by satellite.

Figure 2:
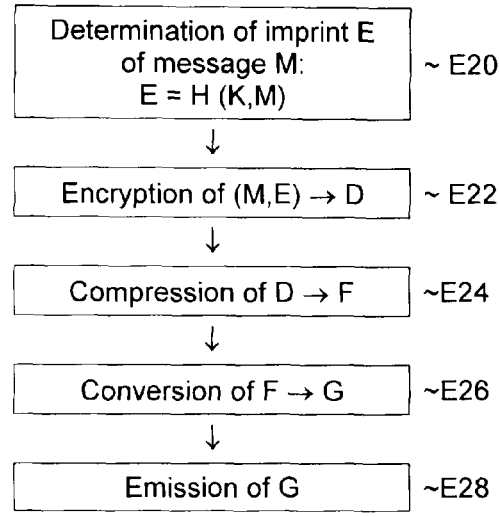
FIG. 2 represents the main steps of a method for data emission according to the invention.

FIG. 2 represents an example of the method for emitting data, which, for example, represent a message M in digital form.

The device that emits message M (which therefore uses the different steps of FIG. 2 described hereinafter) may be a communication device of ground base B or a communication device of aircraft A.

For example, it is considered that message M is represented in binary form by a sequence of bytes (or 8-bit words). Of course, types of encoding other than 8-bit encoding can be envisioned for message M.

The emitting device then proceeds (for example, in a microprocessor controlled by a software program that implements the steps of FIG. 2) to the determination of an authentication word (or imprint) E of message M by means of a hash function that uses a cryptographic key K: imprint E is obtained by an operation of the type E=H (K, M).

For example, a hash function of the SHA2 type is used.

Imprint E, the result of application of the hash function to message M, has a predetermined length, such as 256 bits.

The mathematical properties of hash functions are such that any modification of message M will result in a modification of the imprint obtained by application of the hash function. As described hereinafter, comparison of imprint E of message M obtained during emission with the imprint calculated upon reception then makes it possible to verify that message M has not been altered, and consequently to verify its integrity.

Furthermore, the use of cryptographic key K, present on both the emitting side and on the receiving side, will make it possible, as described below, for the receiver to verify that imprint E indeed has been obtained by a system that is in possession of cryptographic key K, thus making it possible to verify the origin of message M and therefore to be protected against an attack on the communication link.

Imprint E, attached to message M as indicated hereinafter, therefore makes it possible the authentication thereof.

The emission device then proceeds to encryption of the combination formed by message M and imprint E in the course of a step E22, which forms an encrypted message D. For example, an enciphering algorithm of the AES type is used.

In the example described here, imprint E is therefore integrated into the combination of the message to be transmitted before encryption step E22. Alternatively, this imprint nevertheless could be integrated for emission in a later step.

Encrypted message D is then compressed to a compressed message F by means of a compression algorithm, for example of the ZLIB type (step E24).

In the example described here, the emitter device finally proceeds, during a step E26, to conversion of a compressed message F to a message G to be emitted encoded on 6 bits. This conversion step makes it possible to emit compressed message F, initially encoded on 8 bits, with emission devices working on 6-bit words.

During a step E28, it is then possible to emit the message represented by the sequence G of 6-bit words, to the receiver device.

Figure 3:
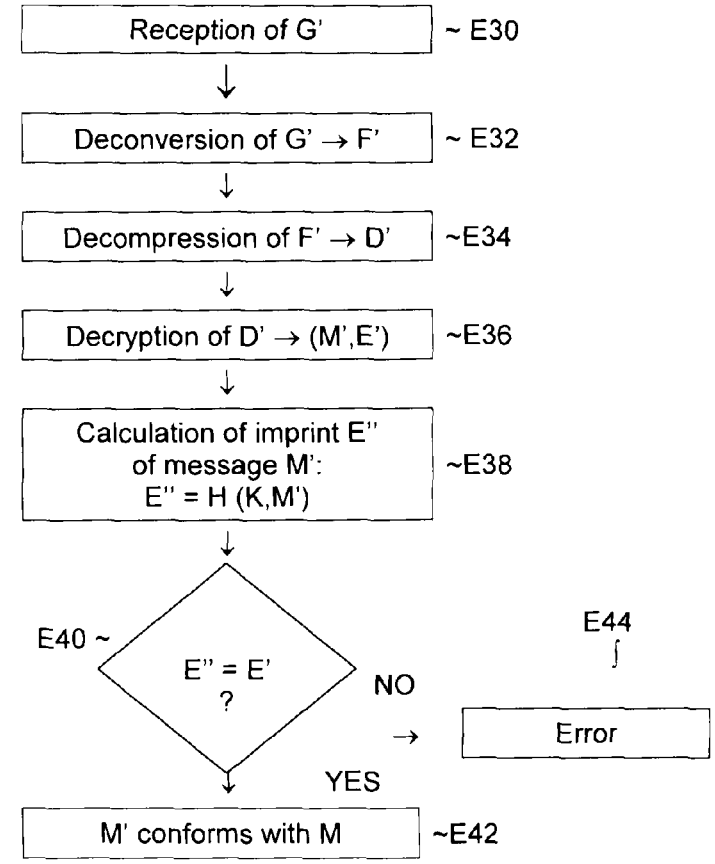
FIG. 3 represents the main steps of a method for receiving data emitted by the method of FIG. 2.

FIG. 3 represents the main steps of the method for reception of the transmitted message, which method is therefore aimed at restoration of initial message M from the raw data received (referenced G' hereinafter) and that consequently comprise steps that are essentially complementary to those of the reception method, in inverse order.

In the course of a step E30, there is therefore first received a message (or data combination) G' in the form of 6-bit words. In the absence of transmission error in the transmission channel being used (in the example presented, in particular ground-to-air link $C_A$ described in FIG. 1), received message G' is identical to emitted message G.

The receiver device (or in other words, generally a microprocessor of the receiver device operating under control of a software program) proceeds to deconversion of message G' formed from 6-bit words into a message F' formed from 8-bit words (normally equal to message F mentioned hereinabove) in the course of a step E32.

This is followed by a step E34 of decompression of message F' in order to obtain an encrypted message D', equal to encrypted message D in the case of normal operation. The decompression algorithm used is the inverse of the compression algorithm of step E24 mentioned hereinabove.

The receiver device then proceeds to decryption of encrypted message D' in the course of a step E36, thus making it possible to reconstruct a message M' and an imprint E', respectively identical to emitted message M and imprint E determined in step E20 under normal operating circumstances.

It is noted in this regard that each of the following causes entails a departure from normal operation and would therefore tend to introduce a difference between message M and imprint E during emission, and message M' and imprint E' obtained during step E36:

an error in processing of these elements by the emitter device, particularly in the course of algorithms used in steps E22 to E26 described hereinabove;

an error in the course of transmission over the transmission channel, caused either by an attacker attempting, for example, to modify the transmitted message or by a dysfunction of the transmission system;

an error in the processing of received data G' by means of the algorithms that have just been described and that are implemented during steps E32 to E36.

In order in particular to verify the absence of such errors, and thus in particular the proper operation of the processing algorithms provided in steps E22 to E26 and E32 to 36 verification of the authentication of received message M' is undertaken by means of received imprint (or received authentication word) E'.

For this purpose, the receiver device proceeds, during a step E38, to calculation of imprint E" of received message M' by application thereto of hash function H used during emission, using cryptographic key K used during emission.

If none of the aforesaid errors has occurred (or in other words, in normal operation), message M' is equal to message M; imprint E" calculated upon reception is therefore equal to imprint E calculated upon emission and consequently to received imprint E', which hypothetically has been processed and transmitted without error.

It is for this reason that, for authentication, it is verified in step E40 that received imprint E' is equal to imprint E" calculated upon reception: in the case of equality (step E42), it is considered that received and processed message M' is indeed in conformity with message M emitted by the emitter device.

On the other hand, if an error has occurred during transmission or one of the processing operations described hereinabove (and because of the properties of hash functions mentioned above), the equalities mentioned hereinabove no longer will be verified and so, in the absence of equality between received imprint E' and imprint E" calculated upon reception, step E40 is followed by step E44, in which it is considered that an error is detected. In this case, the received message, for example, is not taken into account, and, if need be, a request for re-emission thereof by the emitter device may be made.

It also is noted that, by virtue of the use of the cryptographic key known only to the devices authorized to exchange messages, it is impossible for an attacker to furnish, to the receiver device, an imprint E' that would be the result of application of the hash function to a modified message and which alone would be capable of causing the modified message to be authenticated by the receiver device.

In this way the authentication makes it possible to be certain of the origin and integrity of the message and thereby even to verify the exactness of the processing operations effected after authentication during emission and before authentication during reception. These processing operations therefore do not necessitate a maximum safety level; in practice, the algorithms that implement these processing operations could have a certification level lower than that demanded for the overall method, certification then being assured by the authentication algorithm.

The example just described represents only one possible mode of use of the invention. In particular, the described example uses a mechanism of authentication by means of a symmetric key K, but as an alternative it would be possible to envision using other authentication mechanisms, for example systems with a private key and a public key. Similarly, function types other than the hash function, given by way of non-limitative example, may be used to provide the authentication mechanism.

The invention claimed is:

1. A method for emission of data, comprising:
determining an authentication word for the data, the authentication word relating to the data before processing;
processing the data to obtain processed data, the processing including an encryption of the data and a compression of the encrypted data; and
emitting the processed data on a transmission channel.

2. The emission method according to claim 1, wherein the determining includes application of a hash function to the data.

3. The emission method according to claim 2, wherein the application of the hash function uses a cryptographic key.

4. The emission method according to claim 1, wherein the encryption is applied to the data and to the authentication word.

5. The emission method according to claim 1, wherein the processing includes conversion of 8-bit words to 6-bit words.

6. The emission method according to claim 1, wherein the transmission channel is a channel for exchange of data between an aircraft and a ground base.

7. A method for reception of data, comprising:
receiving of the data on a transmission channel;
processing of the received data, the processing including a decompression of the received data and a decryption of the decompressed data; and
verifying of authentication of the processed data.

8. The reception method according to claim 7, wherein the verifying: includes
calculating of an imprint of at least part of the processed data; and
comparing of the calculated imprint with a received imprint.

9. The reception method according to claim 8, wherein the calculating of the imprint includes application of a hash function to the part of the data.

10. The reception method according to claim 9, wherein the application of the hash function uses a cryptographic key.

11. The reception method according to claim 9, wherein the received imprint is a result of application, during emission, of the hash function to the data to be emitted.

12. The reception method according to claim 7, wherein the processing includes deconversion of 6-bit words to 8-bit words.

13. The reception method according to claim 7, wherein the transmission channel is a channel for exchange of data between an aircraft and a ground base.

14. A data emission device, comprising:
means for determining an authentication word for the data, the authentication word relating to the data before processing;
means for processing the data to obtain processed data, the means for processing including an encryption of the data and a compression of the encrypted data; and
means for emitting the processed data on a transmission channel.

15. The emission device according to claim 14, wherein the means for determining includes means for applying a hash function to the data.

16. A data reception device, comprising:
means for receiving data on a transmission channel;
means for processing the received data, the means for processing including a decompression of the received data and a decryption of the decompressed data; and
means for verifying authentication of the processed data.

17. The reception device according to claim 16, wherein the means for verifying includes means for applying a hash function to at least part of the processed data to obtain a calculated imprint, and means for comparing the calculated imprint with a received imprint.

18. An aircraft comprising:
a device including
a determining unit configured to determine an authentication word for the data, the authentication word relating to the data before processing,
a processing unit configured to process the data to obtain processed data, the process including an encryption of the data and a compression of the encrypted data, and
an emitting unit configured to emit the processed data on a transmission channel.

* * * * *